March 2, 1954 E. G. JOHNSON 2,670,971

FLEXIBLE RECORD PROTECTIVE RECORDING MEDIA

Filed March 23, 1951 4 Sheets-Sheet 1

Ervin G. Johnson
INVENTOR

March 2, 1954 E. G. JOHNSON 2,670,971

FLEXIBLE RECORD PROTECTIVE RECORDING MEDIA

Filed March 23, 1951

4 Sheets-Sheet 2

Ervin G. Johnson
INVENTOR

March 2, 1954 E. G. JOHNSON 2,670,971
FLEXIBLE RECORD PROTECTIVE RECORDING MEDIA
Filed March 23, 1951 4 Sheets-Sheet 3
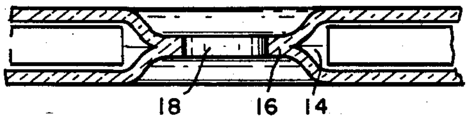
FIG. 12
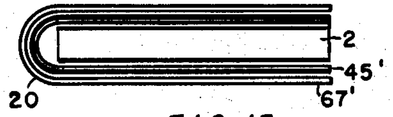
FIG. 15
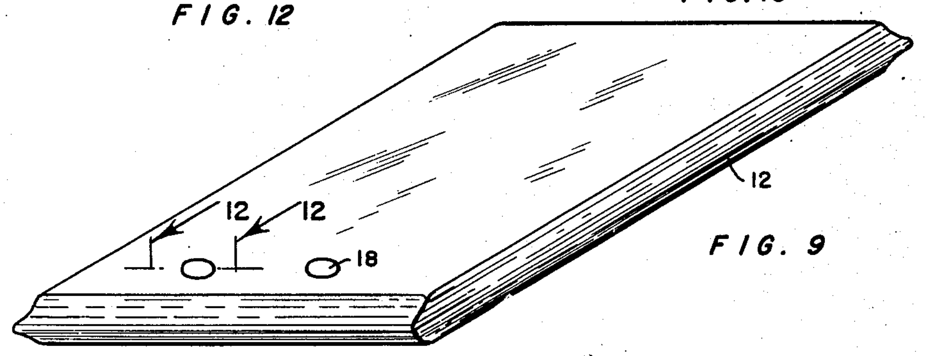
FIG. 9
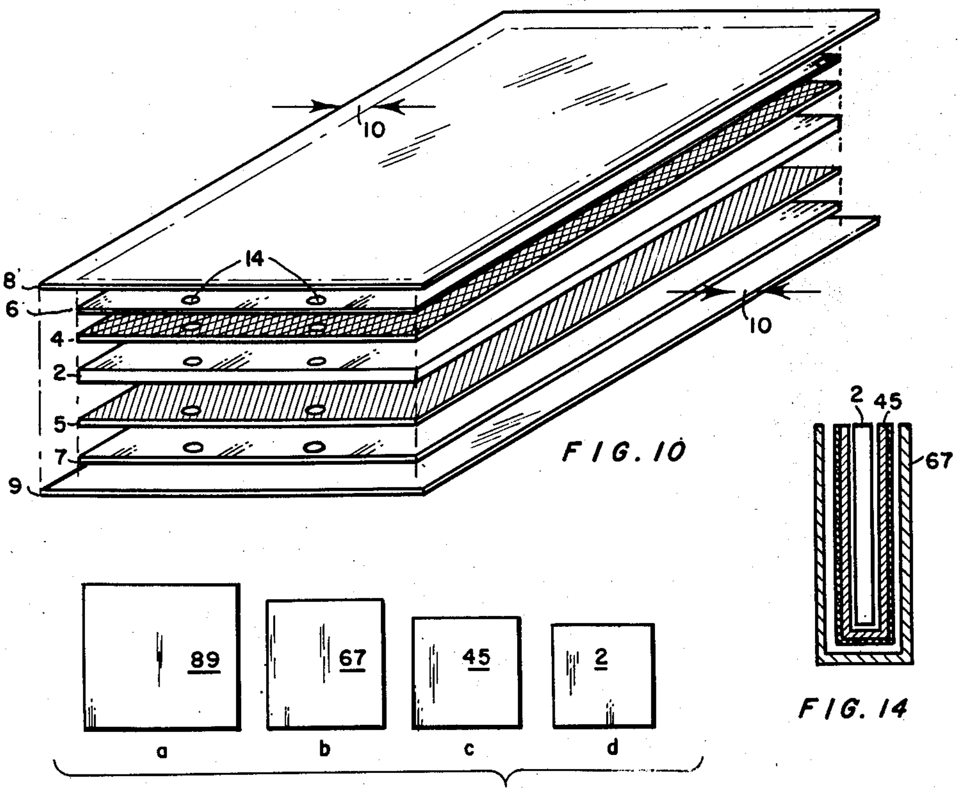
FIG. 10, FIG. 14
FIG. 13
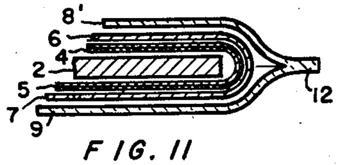
FIG. 11
Erwin G. Johnson
INVENTOR March 2, 1954 E. G. JOHNSON 2,670,971

FLEXIBLE RECORD PROTECTIVE RECORDING MEDIA

Filed March 23, 1951 4 Sheets-Sheet 4

Ervin G. Johnson
INVENTOR.

Patented Mar. 2, 1954

2,670,971

UNITED STATES PATENT OFFICE 2,670,971

FLEXIBLE RECORD PROTECTIVE RECORDING MEDIA

Ervin G. Johnson, Oakland, Calif.

Application March 23, 1951, Serial No. 217,174

24 Claims. (Cl. 282—19)

This application is a continuation-in-part as to my applications Serial No. 501,390 filed September 8, 1943, now forfeited; Serial No. 529,396 filed April 3, 1944, now forfeited; Serial No. 547,151 filed July 29, 1944, now abandoned; and Serial No. 650,223 filed February 26, 1946, now abandoned, the disclosures of which are hereby made a part hereof.

This invention relates to flexible record protective recording media.

It is among the objects of the invention to provide: a record protective flexible recording means; a record protective flexible recording medium which in turn provides for receiving a record thereon under various conditions of curvature of the medium; a flexible recording tape giving protection to the record thereon against tensile distortion due to tensile forces in the tape longitudinally thereof; a flexible record receiving tape of high tensile strength capable of transmitting light therethrough; a flexible record receiving tape of high tensile strength capable of transmitting light therethrough and having a surface relatively low in frictional coefficient in opposing a stylus working thereon; a flexible recording tape capable of receiving a record thereon and also capable of rolling upon itself and forming a tape roll which is self-sustaining, and which may be re-rolled to such self-sustaining condition after having received a record thereon without damage to the record; a rollable record strip which is capable of receiving a record thereon and of being rolled upon itself and unrolled and re-rolled without damage to the record; a flexible record tape capable of having a record affixed thereto by means of a hard instrument working against the tape surface; a flexible record tape having a pressure sensitive recording medium and a window through which a record thereon may be seen from either side of the tape; pressure sensitive recording means capable of use in flexible tape form; a recording means of the pressure sensitive type having a protected transfer strip fixed in position with a passage for receiving a record strip freely between the transfer strip and the area of pressure application; a flexible pressure sensitive recording tape the construction of which permits self accommodation to surfaces of curved shape; a pressure sensitive flexible writing tape which is readily separable into one or more separately useful components; (for example one embodiment is separable to form a flexible pressure sensitive adhesive tape, a record strip having a protective strip support; and a transfer strip protected by a protective strip;) a pressure sensitive flexible writing tape having a protective sheath which tape can be cut off and a seal effected along the cut edges so as to protect the record receiving portion from foreign matter; a flexible pressure sensitive recording device having two opposed pressure areas whereto recording pressures may be applied; a flexible pressure sensitive recording device which can be rolled upon itself; a flexible pressure sensitive writing tape; a transparent pressure sensitive recording tape; a flexible pressure sensitive protected record recording tape which can be severed in any desired length; a flexible pressure sensitive protected recording sheet which can be transilluminated; a flexible recording sheet which is protected from abrasion; a flexible pressure sensitive recording sheet from which the marking medium may be removed and the record sealed up to prevent obliteration, or additions to, the record; a pressure sensitive protected recording adhesive tape capable of permanent adhesion to curved surfaces; a pressure sensitive adhesive, tension sensitive releasable protected pressure sensitive recording tape; a protective recording medium upon which a recording can be effected on two surfaces simultaneously.

The invention further relates to effecting a relatively permanent record and particularly has for an object to provide flexible media, such as tapes, for receiving a record, which media are durable in adverse environments such as in moisture, oil, dirt and the like, and which media are protective of the record against the effects of such adverse environments.

It is a further object of this invention to provide recording media of the character referred to upon which records of a relatively permanent and indestructible character may be effected under conditions heretofore considered unfavorable. Thus, one may use certain embodiments of my invention to effect a permanent and durable written record in the rain, even though the medium written upon be directly exposed to and wetted by the rainfall. Such media are of immediate utility to engineers, surveyors, construction inspectors, deep water divers, and the like.

Another object of this invention is to provide recording media of the character referred to by means of which recordings of the permanent and durable quality desired may be effected by the use of implements or stylii which themselves deposit no material such as ink, graphite, or pigmented particles; but which by preference, produce the recording through the agency of impact, pressure applied by a sliding moving point or stylus element, or pressure applied as by the line contact type faces, the record left thereby having been produced by the effect of such pressures or impact upon materials and arrangements forming part of the flexible record receiving medium.

It is another object of the invention to provide a flexible record strip having a protectible writing surface.

It is another object of the invention to provide a flexible recording tape base or support of thin sheet material having a minimum deformation in response to normally expectable stress in tension along the tape.

It is another object to provide a support of sheet thinness for a record which record is required to be flexible and such support being highly flexible in character and having a tough, light pervious, pressure pervious, puncture impervious, fluid impervious quality and further providing adequately high tensile strength to resist distortion of the record in tension along the plane of the sheet.

When embodied in tape form, the tape may be provided with an adhesive coating on one surface; and such tapes find practical application by mechanics in the coding of wires, pipes, and the like in conformity with plans and schemes of maintenance, since the coding may be effected immediately before, though more frequently immediately after, the tape has been applied. Accordingly but one roll of tape serves manifold marking uses. The tape is substantially unaffected by dirt and oil, which may be wiped away to leave the record cleared thereof and as legible as when first prepared.

The invention may also be applied in other ways; the media may be provided in the form of recording cards for the making of records in the out-of-doors in rainy weather as encountered by engineers, builders and others whose duties require their keeping good records while such records are subjected to a wet environment. Deep sea divers having only headgear to maintain their oxygen supply can write under water on such cards, allowing the cards to drift to the surface when completed. Such record cards when employed in the vicinity of large bodies of water such as rivers, bays, tanks, or dams are preferably made to float should they fall in the water, and by one embodiment of this invention such cards may remain afloat for indefinite periods of time without injury to records already placed thereon, or to their capacity to receive further writings immediately upon removal from the water.

Such record cards may also be used in business firms where the function of the cards is to provide a permanent ineraseable record, and wherein the discovery of tampering with the record may consist in the detection of the presence of or absence of an element of which the tamperer may be unaware, such as an inert invisible gas, other than air, which gas escapes with tampering unbeknownst to the tamperer.

It is a further object to provide a pressure sensitive record tape with the record protected against moisture and the like.

Other objects of the invention will become evident from the following specifications taken in connection with the accompanying drawings, in which:

Fig. 9 illustrates an embodiment of the invention as a rigid pad or card, in its complete appearance;

Fig. 10 shows the elements of the pad in Fig. 9 in exploded relation;

Fig. 11 is a fragmentary section illustrating the relationship of the elements of the rigid pad in Fig. 9;

Fig. 12 illustrates a detail of Fig. 9;

Fig. 13 illustrates a modification of the method of assembly of the rigid card;

Fig. 14 illustrates a section through a subassembly of elements of Fig. 13;

Fig. 15 illustrates another subassembly for use with the modification of Fig. 13;

Figure 2:
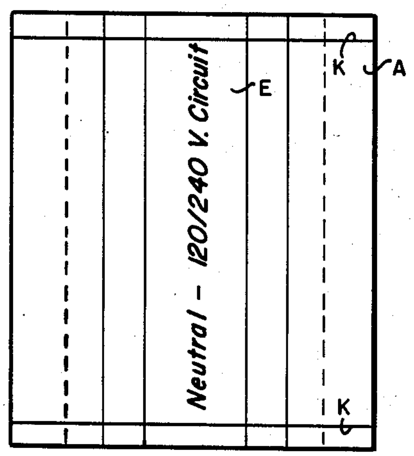
Fig. 2 shows a record strip, produced by such a roll of tape, in plan, to which a marking has been applied.
Figure 4:
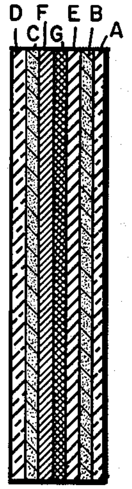
Fig. 4 is a section along the longitudinal axis of the tape off which the marker of Fig. 2 is cut.

Referring now to Figs. 1 through 7, the marking tape is formed to include a transparent film A, as of cellulose acetate, or cellophane, having an adhesive coating B which is transparent also. A narrow strip of translucent record paper, such as onionskin E, extends along and covers the lower side central longitudinal area of the tape film A. Next in order is a film of transfer material such as carbon film G carried by a strip of transfer web F, the carbon and web together being known as transfer sheet, or transfer strip. The carbon is disposed against the record strip E, and is transferred to the record strip by pressure exerted by the user employing a round-pointed metal stylus, a pencil lead, or the like, upon the surface of film A. For example, the lettered matter on the label of Fig. 2 is impressed on the lower surface of record strip E, Fig. 3, and is visible through the transparent adhesive coating B and transparent film A. The elements E, F, and G are suitably held to the films by a continuous strip D, which may be provided with adhesive coating C and may be similar or equal in transparency to strip A.

Figure 16:
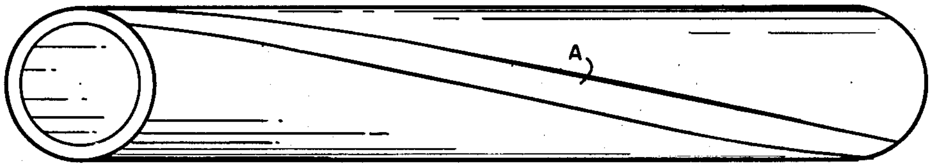
Fig. 16 shows the application of the tape on the surface of a cylinder in a spiral position.
Figures 1, 3A, 3B, 3C, 5A, 6A, 7A, 7B, 8A, 8B, 17, 18:
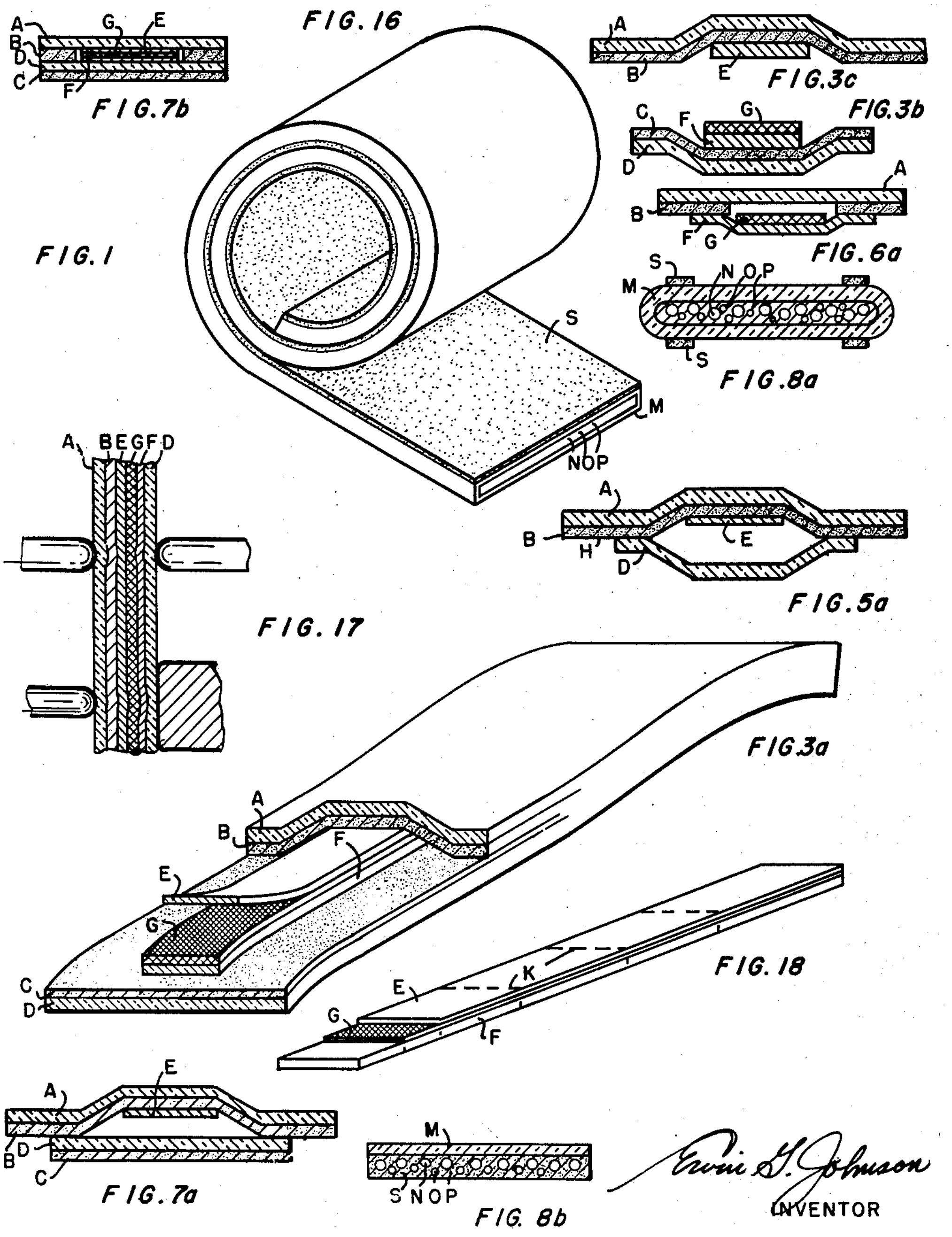
Fig. 1 is illustrative of a roll of tape, partially unrolled.
Fig. 5 is a transverse section through a modified form of the marking tape and Fig. 5*a* shows parts thereof.
Fig. 6 is a transverse section through another modification of the marking tape and Fig. 6*a* shows parts thereof.
Fig. 7 illustrates still another modification of the tape and Figs. 7*a*, 7*b* and 7*c* show parts thereof.
Fig. 8 illustrates another pressure or impact sensitive record means employable in lieu of that provided in the modifications of the first seven figures and Figs. 8*a*, 8*b*, and 8*c* illustrate various features and modifications thereof.
Fig. 17 illustrates methods of recording.
Fig. 18 illustrates a specific detailed construction of the recording media.
Figures 3, 5:
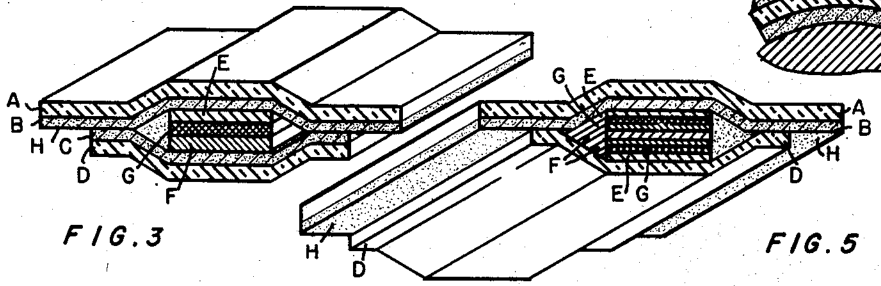
Fig. 3 is a section transverse the longitudinal axis of the tape of Fig. 2 and Figs. 3*a*, 3*b*, and 3*c* illustrate the several components of Fig. 3.

Strip D is, in the modifications of Figs. 3 and 5, narrower than strip A, in order to leave marginal adhesive strips H at both edges of the tape with which to hold the tape in roll form as viewed in Fig. 1 prior to use, and with which to fasten the cut-off markers to an object to be marked.

The adhesive tape A, formed by the film, and coating B, is obtained on the market under the trade name "Scotch tape," the cellophane film A of which is impervious to water and is easily cleaned of dirt, grease, etc. It is also tough and pliant, so that an impression is easily transmitted therethrough to the carbon or transfer strip. A smooth backing surface, not necessarily hard, provides sufficient bearing for writing on film A to cause the formation of a trace on strip E, which trace is legible through strip E, adhesive B, and film A. In the tape itself the smooth backing surface is provided in its most efficient relationship in the modification of Fig. 7 where film D is directly against web F and serves as a backing surface under certain use circumstances. The cellulose acetate films A and D, known as cellophane are, as pointed out above, tough and pliant; in other words they have considerable tensile strength and are flexible, the strength resisting rupture due to stretching in the length of the strip. In the form of sheet shown, that is, in the form of tape, where the width is small as compared to the length, the material is quite rigid in the direction of the sheet film across the strip. This material has, on the exposed side, or the top side as seen in Figs. 2, 3, 5, 6, 7 and 8, a very smooth and relatively friction free surface so that little frictional resistance is offered to a stylus bearing point as it slides thereover. This smooth surface, being friction free, resists abrasion and tearing action, and also contributes to another useful effect to be referred to in the following.

Both strips of paper E and F are relatively weak in tensile strength and will not resist puncturing by a stylus in any adequate degree. The adhesive material of coatings B and C, as used in the "Scotch tape" referred to above, as well as the carbon film G, have relatively poor tensile strength in the direction of the tape length but they have the quality of pressure sensitive adhesiveness. Moreover, as supplied the adhesive coating is permanently adherent to the cellophane on one side of the coating, but will adhere to the smooth surface of the cellophane film in response to pressure and does release itself therefrom when tension is exerted to pull the coating away from the smooth surface of the film in a peeling action.

The acetate films A and D therefore supply tensile strength to the record strip, provide resistance to puncturing while allowing transmission of record producing pressures, and provide resistance to abrasion and tearing of the record. The free surface of film A is so slick that any fairly hard pencil with a slightly worn off point leaves practically no trace of carbon as it is used for a stylus for writing by hand, leaving the surface clean. The function of the strip D as a backing strip is particularly important where the tape is employed as a label for paper bags and the like containing soft bulk commodities such as oatmeal, which materials, though filling the bags, offer no substantial support for writing thereon. The backing strip D supplies this function. When the pressure sensitive adhesive coat C in Fig. 7 has been placed in contact with the paper of such a bag, the backing strip D itself becomes a relatively hard puncture resisting smooth surface by which the point pressure exerted by a stylus is adequately resisted in the lettering or the writing operation to produce the record desired. Such writing also serves to make the adhesive more secure on the bag surface.

The function of the pressure sensitive adhesive has with it the function of tension sensitive release referred to above and which is well known in "Scotch tape," wherein the release function is incident to tangential tension in the roll strip removal. This release function is partially contributed by the nature of the acetate strip surface to which it adheres in response to pressure. None of the adhesive remains on the surface after peeling takes place; neither does the adhesive remove any of the acetate film. These functions are of significance in the present tape. The acetate film protects the record from contact with the adhesive and hence the record strip, with the record on or not, is not impaired by the action of the adhesive in peeling off from the roll. The rolling of the tape upon itself after the writing has been effected on the record strip in no way impairs either the record or the adhesive, and for this reason the tape may be written upon and rerolled before application as a label.

It will be noted that the exposed adhesive areas H of Fig. 3 may be folded back with respect to the body of the tape, and when so disposed the legible side of this tape adheres to a window for reading through the window; that is, the legible side is against the surface to which the adhesive adheres.

In the modification of Fig. 5 the adhesive C of strip D has been omitted, since it is here unessential. In addition, in this modification, the record strip and carbon is duplicated in reverse, so that an impression may be created on whichever face of the tape one chooses. Moreover, by inserting a relatively inelastic strip, such as of tin plate, between the strips F, a record may be placed on both faces, the hard strip preventing transmission of writing pressure to both transfer films. This makes it possible to fasten the tape on the inside of a glass to be seen from the outside of the glass, the writing having been done before placing on the glass.

Figure 6:
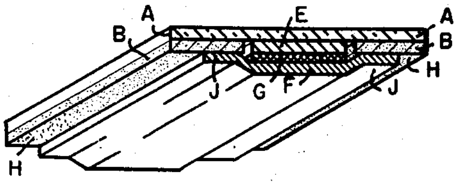

In the modification of Fig. 6 the tape is simplified by omitting the under strip D, for use where waterproofing is effected without the strip D, or otherwise as for marking cans and like round surfaced objects. Here the adhesive B has been omitted from the area of strip A opposite the record strip E to accommodate strip E directly against strip A. The carbon G extends only across the width of the strip E, and its web F extends edgewise of the tape therebeyond to adhere to the adhesive coating B as at J, leaving marginal strips H of adhesive coating corresponding to the strips H in Figs. 3 and 5.

Figure 7C:
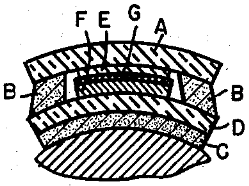
Figure 7:
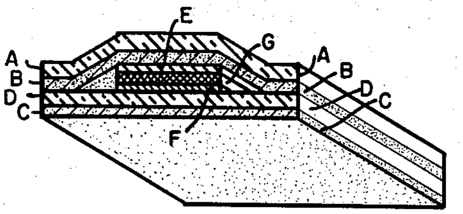

In the modification of Fig. 7 the base strip D is adherent to the film A through the adhesive coat B, and the coat C of adhesive extends all over the bottom area of the tape. The area of adhesive coat B opposite record strip E can be omitted, as is done in the modification of Fig. 6, with a corresponding decrease in tape thickness and coat. It will be noted that the gross width of the tape of Fig. 7 is less than the gross width of the tape of Figs. 3, 5 and 6 for equal width of the writing surface.

In respect of the tapes of Figs. 3, 5, and 6 it will be further noted that the exposed adhesive areas can be turned over the edges of the lower strip D in Figs. 3 and 5 and J of Fig. 6, thus making a card which may be inserted in a pre-provided card frame. It is clear that the adhesive joint at the edges of the tape forms a seal preventing the entry of water and the like at the edges.

It is also easy to seal the ends of a cut-off strip of the tape, as follows: a portion of the strip D at each end of the label, with the corresponding portions of strips E, F, and G, is cut away so that the corresponding uncut-off ends of film A and adhesive may be folded under and to adhere to film D. A similar effect is obtained by first pulling D and A apart for about a quarter of an inch at each end of the cut-off tape, then cutting off the exposed ends of strips E and F and G. The remaining ends of A and D then can be sealed together at the areas previously separated by the cut-away portions of the strips E, F, and G. Accordingly the tape may readily be converted into a water proof marker which may be marked upon in the wet, and the marking remain through adverse conditions.

If one chooses, the films A and D may be replaced by rubber halide films, as Pliofilm, the adhesive B and C being omitted entirely, and the sealing along the edges being effected by the application of heat, resulting in a vulcanized seal along the edges. After cutting off a section of tape, the inside strips E, F, and G may be pulled endwise slightly and cut off, so leaving a margin at each end of the strip of tape for vulcanizing to effect a sealed envelope upon which any legend desired may be impressed as before described with respect to the modifications employing cellulose acetate films.

The method of effecting the written legend or trace within the envelope of protective transparent material may be varied as one chooses. For example, instead of carbon, one may use a wax transfer which adheres to a suitable translucent record strip E. It will be observed that the Fig. 3 modification has a central longitudinal underarea which is not coated with adhesive. This is in order to provide for handling the tape without having it adhere to the fingers, the marginal adhesive providing adequate adherent power for many applications. In addition this central nonadherent area is juxtaposed to the writing area and, in use, may be run over a stationary platen where it receives the written impression. The absence of adhesive here is desirable in order to prevent adhesion to the platen incident the application of pressure in writing.

Referring particularly to the Fig. 3 modification, it is to be observed that the coatings B and C of pressure sensitive adhesive are in contact. This produces an extraordinarily secure bond which is self intensifying because the coatings draw together even in the absence of externally applied pressures and also receive some pressing together due to the lever action inherent in the acetate films as soon as one small area has been caused to adhere.

It is also characteristic of the bond between the surfaces of coatings B and C in Fig. 3 that as the assembly is curved continuously about curved surfaces as illustrated in Fig. 7*c* this adhesive material allows a gradual and relative movement between the two bodies of the coating along the common plane of adhesion without allowing any separation of the bodies and while maintaining an actual adhesive bond between the surfaces. This quality permits the upper and the lower strips A and D to readjust relatively to compensate for the different arc lengths they must cover when applied to curved surfaces. This also facilitates the rolling of the material in rolls and tends to avoid the creation of wrinkles in the inner layer of any section of the tape in a roll.

Notwithstanding the high degree of bonding in the Fig. 3 modification as referred to in the foregoing, the two strips AB and CD are, none-the-less, separable by pulling the strips in opposite directions perpendicularly from the plane of adhesion. Since the backing strip F with carbon film G is, in this modification, bonded to strip CD by coat C, and the record strip E is bonded to strip AB by the coating B, the separation of strips AB and CD to separate status as shown in Figs. 3*b* and 3*c* allows of replacement of record strip E and also allows the separate use of these strips. For this purpose the strip E in Fig. 3 may be made of transparent, translucent, or opaque material if desired, from which the adhesive coat B will separate readily under tension. The strip E may, therefore, be removed and replaced by a fresh strip E which may be written on directly for viewing from either side of the tape if strip E is transparent or translucent. Of course, the strip CD and bearing strip F with G can also be reassembled with AB and E and the same film G thus repeatedly utilized.

It is also to be noted that the strip D in Fig. 3, with adherent transfer backing F and film G are also utilizable separately from assembly ABE as seen in Fig. 3*b*. This strip may be pressure attached to any paper or like surface and pressure of a stylus on the smooth uncoated surface of film D will cause the transfer of the mark to such surface from coating G.

Referring now to Fig. 6, this modification allows the longitudinal drawing out of the strip E, the tape with strip E removed being shown in Fig. 6*a*, and the insertion of a new strip E, because strip E is not adherent to either the surface of strip A or to the surface of carbon film G. It is also evident that a writing may be effected on strip E from either below or above strip E in Fig. 6 or it may be effected from both directions simultaneously in the manner illustrated in Figs. 17 and 20.

Figure 8:
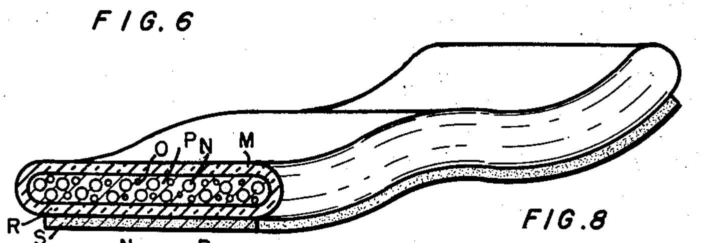
Figure 8C:
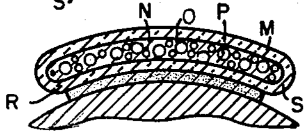

Referring now to Fig. 17 it is observed that any one of the tapes illustrated by Figs. 3, 5 and 6 as well as those illustrated in Figs. 7, 8 and 8*a* when the coatings C and S are omitted, may be written on simultaneously at two different longitudinal points from both sides and that a single writing or record may be produced by two opposed like stylii moving together in alignment and pressed toward each other from opposite sides. The double stylus makes a relatively sharp dense mark, and with a minimum of distortion of the films A and D. The relatively low frictional resistance offered the stylii by the smooth surface of the Cellophane withholds wear from the stylii and thus delays sharpening thereof which would tear the material eventually. The control of the stylii to move together will be described. It is also clear that, with the Fig. 5 modification, two different records may be placed on opposite strips E at the same time.

Referring to the Fig. 7 modification, it is evident that the backing F with carbon film G can be drawn endwise out of the tape after the record has been made, thus leaving the record unalterable, as is evident from a consideration of Fig. 7*a*. The removal of the transfer strip FG leaves the record strip E protected by film A and by film D, and also removes the dark and opaque background due to the carbon film G, so that the record becomes silhouetted against films D and A and can be seen all of the way through the tape of Fig. 7, just as can the record made on the strip shown in Figs. 8, 8a, 8b, and 8c to be described.

A similar effect is also available in the modification of Fig. 5, as is shown in Fig. 5a. In this figure the transfer strips FG of Fig. 5, with the metal backing strip if any therebetween, have all been removed. When the writing has been made and the material so removed, the parts A and D flatten and seal strip E in.

It will be observed also, in regard to Fig. 7, that the adherence of coating B to acetate film D is not as great as is the adhesion between coatings B and C in the Fig. 3 modification, and that since the entire under surface of strip D is covered by coating C, the strip A, with adhesive coating B and recording strip E can readily be peeled off strip D while strip D remains self attached to a surface. This allows, among other things, removal of all or part of the record strip component E, and also allows for the cutting off of sufficient of the recording strip itself so that the strip A and coating D can form a complete seal around the remainder of the record strip within an envelop so formed, as described in connection with Fig. 2. To facilitate this procedure the strips E and F may, as shown in the modification of Fig. 18, be provided with registering lines of weakness *k*, visible thru the films, so that after cutting the tape strip at a point between two adjoining lines of weakness *k*, the portions of strips E and F of the cut strip portion or segment so severed may easily be pulled out axially to break off at these lines of weakness. In the absence of such especially provided lines of weakness, the strips E and FG may be broken at a given point, removed from a cut section, without breaking the protective strips A and D, by (1) repeated bending at the point followed by (2) clamping the various strips firmly together immediately adjacent the point at one side, as with the fingers, while (3) pulling the strips individually from the cut end of the tape.

In the modification of Fig. 8 the two upper and lower transparent films M and R of cellulose acetate or rubber halide, or the like, are formed by the flattening of a continuous tube of the material within which the record receiving means has been poured or deposited prior to flattening. The film M, being made of the tough, transparent, deformable acetate, resists rupture and is readily formed in rolls and provided on the side R with an adhesive, preferably of the pressure sensitive type.

The pressure sensitive record receiving means illustrated by Fig. 8 is composed of three mixed compounds which, in their unused state are all, preferably, transparent.

Two compounds N and O are, when mixed or in actual physical contact, productive of a coloration, and the third compound P serves as the framework which holds the color producing compounds separated until through rupture of compound P the compounds N and O come into contact and form a localized coloration.

The compound P may be formed of a one-to-one solution of gum dammar in toluene (100 grams) and a plasticizer such as Di-(para tert-butylphenyl) meno-phenyl phosphate ($C_{26}H_{31}O_4P$) 8.5 grams.

Compound N is formed of:

| | Grams |
|---|---|
| Glycerine | 33 |
| Ferric ammonium sulphate | 3.2 |
| Water | 14 |

Compound O is formed of:

| | |
|---|---|
| Glycerine | 33 |
| Gallic acid | 6.4 |
| Water | 14 |

A portion of compound P and compound N is formed into an emulsion NP in suitable emulsifying apparatus, the dispersed cells of N being made very small, such as to pass a screen of 325 mesh to the inch.

A portion of compound P and compound O is formed into an emulsion OP by like means.

The emulsions NP and OP are then mixed to produce the three-phase mixture NOP which, when at a plastic consistency, is extruded into the continuous tube MR and the tube is formed to flatness. The thickness of the section of compound NOP need not exceed the thickness of the cells by more than two films of compound P.

Instead of mixing the emulsions and extruding as described, they may be successively brushed onto film M with a drying interval, and then a cover film R bonded thereover, to form a package in general conformity with the modification with Fig. 8.

It will be understood that any mixture equivalent to the three-phase mixture described in the foregoing may be substituted therefor.

In use, pressure by a bluntly pointed instrument on the protective strip M is transmitted to the three-phase mixture causing a rupture of the compound P sufficient to permit the cells of compounds N and O to come into contact at the points of rupture.

Inasmuch as the compound P protects the coloring compounds N and O, no water can get into the recording region. Moreover, if the compound NOP has a gas mixed therewith, its density becomes less than that of water, so that the film itself floats.

In the modification of Figure 8b the compounds N and O are separated in the compound P, the whole being dispersed directly in the pressure sensitive adhesive coating S. The acetate film M serves again as a transparent tough flexible base for the record material.

While the drawings have shown the various strips as of substantial thickness, this is for illustration only, for it will be appreciated that the various strips, though as many as ten, do not amount to a very great thickness.

Several of the modifications are described to be so constructed that the markings may be entirely silhouetted through the acetate films and/or the adhesive materials. These are particularly desirable as markers for objects having a color against which the mark alone is desired to appear. The tape of Fig. 3b is particularly effective in the marking of rough surfaces since the covering D is, itself, smooth and the transfer material G is forced into the interstices of the rough surface. It is evident in Figs. 1, 3b, 7c, 8, 8c and 16 that the tapes, because of their flexible characters may be caused to adhere to a wide variety of curved surfaces, as well as being capable of rolling into tape form repeatedly.

Figure 19:
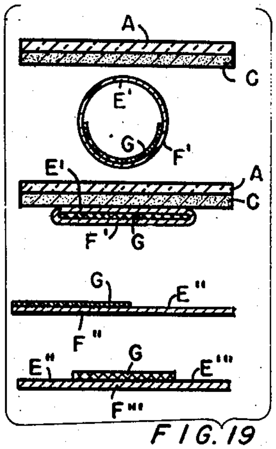
Fig. 19 illustrates further modifications in the construction.

In Fig. 19 further constructions are illustrated, as by their methods of construction. The strip F′ corresponds to strips F and is formed of a translucent strip having only one half of its area coated in the direction of its axis. The strip is formed into a tube with the coating G innermost. The centerline of the uncoated portion is juxtaposed to the centerline of the coating C in assembly, and attachment having been made along this line the tube is flattened laterally. The uncoated portion of the tube F′ is itself the record strip characterized by the symbol E′. The two lower portions of Fig. 19 illustrate two possible preliminary dispositions of the coating G on the composite transfer backing strips F″ and F‴ with recording strip portions E″ and E‴. The modifications of Fig. 19 are not as flexible as those previously described because of the integral nature of strips E′ and F′ which cause them to resist joint bending to a greater degree than other modifications in which the strips are free to slide upon one another.

Figure 20:
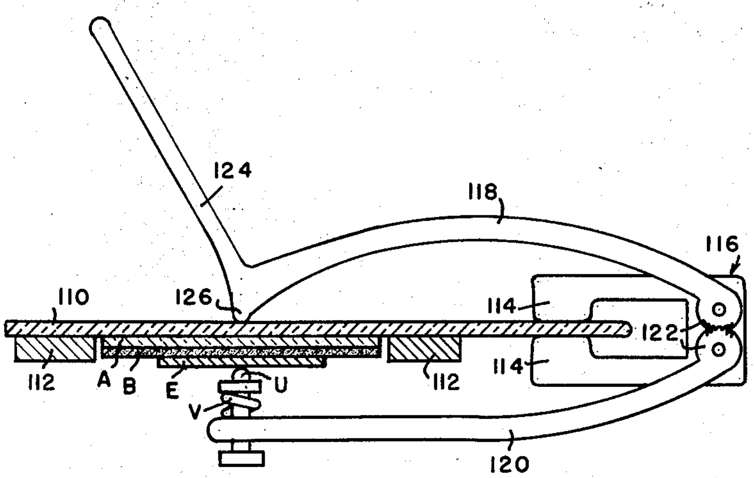
Fig. 20 illustrates manual recording implements for use with certain modifications of the tape.

In Fig. 20 the component ABE shown in Fig. 3c is shown in a position for receiving a writing which will be legible through the film A and adhesive B. The paper E is being marked by a suitable marker U which may be a pencil lead carried on a plunger pressed to the lower surface of E by a spring V. The tape A is positioned against the lower surfaces of a sheet of clear glass 110 between guides 112. The glass provides a coplanar support for the feet 114 of a sliding yoke 116 to which are pivoted on parallel axes a pair of arms 118 and 120 geared to move simultaneously toward and away from each other by suitable gears 122 under control of a handgrip 124 having a pointer 126. The writer grasps 124 and writes causing point 126 to bear on the top of the glass sheet 110 in tracing out the characters, while marker U follows the action of pointer 126 on end off the glass surface in writing on E. The feet 114 may be provided with anti-friction surfaces or rollers as desired, but a high polished set of interfaces with a little lubricant will serve quite well. With this apparatus, the writer need not accommodate himself to the difficulties of directly writing for mirror reading.

Referring now to Figs. 9 through 15, the invention is shown embodied in a writing pad comprising a central backing member 2 of rigid material having a rather smooth hard surface, against each free face of which is positioned a transfer sheet such as carbon papers 4 and 5, the carbon-coated surfaces of which are disposed away from the backing member to contact the inside surfaces of the translucent sheets of paper 6 and 7. The outermost sheets 8 and 9 are of transparent tough material resistant to attacking substances such as acids, water, or oil and dirt. The outer sheets are made of Pliofilm or Cellophane in one embodiment. Pliofilm is a trade name for a relatively tough waterproof, heat-pressure vulcanizable, rubber halide readily obtainable on the market. Cellophane is a cellulose acetate film, also obtainable on the market under the trade name. Other transparent films may be used to suit the particular conditions provided they are capable of transmitting an impression. The sheets 8 and 9 are illustrated somewhat greater in dimensions as by the margins 10.

These margins are for bonding together to integrate the several sheets in compact relation to form a substantially integral package having two sheets, 6 and 7, one on each side of the backing 2, for receiving an impression. The package is illustrated in Fig. 9.

The carbonized surface of sheet 4, for example, is exposed upwardly, in Fig. 10, and the carbonized surface of sheet 5 is exposed downwardly in Fig. 10. The impression is obtained by pressing a pencil or stylus against the outside surface of sheet 8 or sheet 9. In the case of pressing against sheet 8, the carbon from sheet 4 is transferred to the lower surface of sheet 6, which being translucent, produces a visible trace of the writing from the pressing pencil or stylus. The pencil, of course, serves only as a convenient means of exerting pressure. The lead of a pencil leaves substantially no visible trace on the exterior surface of sheet 8.

Accordingly, a written record has been made on the sheet 6, which is within the envelope or protective coating of sheet 8. If desired, sheets 4 and 6 may be duplicated between sheets 8 and 6, so that two or more copies may be obtained. However, the number of effective copies is limited by the pressure required and the strength of sheet 8 to withstand the action of the pressing device. More sensitive transfer media are desirable for multiple records.

In order to preserve the written matter against moisture, the Pliofilm sheets 8 and 9 are vulcanized along their juxtaposed edges as by the margins 10 to produce the airtight, watertight, seal 12. This vulcanization is readily produced by pressing the margins 10 together with a slight amount of pressure and a temperature high enough to produce tackiness only. This procedure is well known with respect to Pliofilm. The bond obtained is illustrated in Figs. 11 and 12.

It is desirable to provide for fastening the pad in a ring binder and to this end perforations 14 are initially provided in the elements 2, 4, 5, 6 and 7 as a unit. Incident to the vulcanization of margins 10 to form sealed joints 12, the Pliofilm material over and underlying openings 14 is pressed together and also vulcanized to form a web 16. This web is subsequently perforated centrally to produce the perforations 18, which are of smaller diameter than the perforations 14, yet of sufficient diameter to pass rings of ring binders and the like. In this way, the pad is sealed around the ring binder openings as well as around the outside edges.

Fig. 10 simply illustrates the relationship of the various sheets. This relationship may be attained in various other ways, to better serve the needs of the manufacturer and/or the user.

In Fig. 13, *a* represents the size of a flat bag 89 of Cellophane or Pliofilm, which is large enough to receive a second bag *b* of translucent paper 67, which bag *b* is, in turn, large enough to receive a third bag *c* of carbon paper 45 having the carbon disposed against the inside surface of bag *b*. Bag *c* receives the backing member 2.

Bags *b* and *c* are, preferably assembled in manufacture as a unit, and can be used as replacements. One end of bag 89, if made sufficiently long, may be repeatedly sealed at the edge, and the sealed edge cut off for removal of the elements 2 and 6. The bags *b* and *c* may be severed and portions 67 retained as the record. A new assembly of bags *b* and *c* is then placed on backing 2, the assembly inserted in envelope *a*, the edge sealed on bag 89, and the assembly is ready for re-use. Carbon bags 45 may, of course, be re-used also, if desired.

It is not necessary to make sheets 6 and 7 in bag form for insertion within the envelope formed by sheets 8 and 9. Neither is it necessary to form carbon sheets into a bag. They may be simply folded upon the bottom edge of backing 2, in the relation indicated by Fig. 6, so as to result in an edge-on profile as illustrated in Fig. 15. The bridge portion 20 of the assembly is then readily inserted within bag 89.

The materials and the design are preferably such that the density of the pad is lower than that of water. This may be insured by the entrapment of air, or a pure inert gas, other than air, in the envelope formed by the Pliofilm.

In the assembly of Fig. 15, the carbon and record sheets are preferably secured together only at one edge so as to insure a flat lay.

It will be obvious that the sealing of the record pad within the Pliofilm envelope insures that a record once made cannot be altered except the seal be broken in order to do so. To make sure that the envelope has not been unsealed and replaced by unauthorized persons, the envelope may be initially charged with a pure inert invisible gas unknown to the user, so that its presence or absence may be determined when opened by an authorized person by any gas-identifying means.

Having described my invention and preferred embodiments thereof, it will be evident that many variations thereof will occur to those skilled in the art. Reference is made to the accompanying claims which set the scope of the invention secured to applicant.

I claim:

1. A flexible tube having a thin deformable wall of tough flexible material continuously integral around the tube axis, and a flexible pressure sensitive for marking recording strip inside said flexible tube capable of receiving a recording impression transmitted through the tube wall.

2. In combination: continuously flexible pressure responsive for marking recording means, and a continuously flexible therewith pressure transmitting protective cover extending throughout the area for marking of the recording means uniformly secured to the first means for flexing therewith whereby the assembly may be rolled upon itself.

3. A tape providing a flexible record receiving body comprising a strip of tough flexible sheet material and flexible pressure sensitive record means continuously fastened thereto throughout the length of the strip for flexing therewith.

4. A tape providing a flexible record receiving body comprising a strip of cellulose acetate sheet material and a strip of flexible pressure sensitive for marking means continuously fastened thereto throughout the lengths of the strips for causing joint identical flexing together of the strips.

5. In an article of manufacture adapted to receive a record in writing in places likely to prove destructive of a record sheet, in combination: a substantially rigid flat sheet backing member, a transparent record sheet disposed adjacent said backing member in such relation thereto as to be supported thereby and forming a record receiving area coextensive with the two areas of the two faces of the backing member, a transfer sheet disposed between the record sheet and the backing member with the transfer material disposed to be transferred to the record sheet when pressure is applied to the record sheet by a stylus pressing the same against the backing member; and means for protecting the transfer sheet, record sheet, and backing member, from foreign matter comprising an envelope of transparent deformable material entirely encompassing the sheets and member and lying flat against the record sheet areas and forming a barrier against entry of foreign matter to the protected members, and adapted to transmit pressure of a stylus pressed thereagainst and onto the backing so that a record is made on the record sheet.

6. In an article of manufacture adapted to receive a record in places likely to prove destructive of a record sheet, in combination: a substantially rigid flat sheet backing member, a record sheet disposed adjacent said backing member in such relation thereto as to be supported thereby and forming a record receiving area coextensive with the area of the backing member, a transfer sheet disposed with the transfer material thereof disposed to be transferred to the record sheet when pressure is applied to the record sheet by a stylus pressing the same against the backing member, and means for protecting the record sheet from foreign matter comprising an envelope of deformable material entirely encompassing the record, transfer, and rigid sheets and forming a barrier against entry of foreign matter to the protected members and adapted to transmit pressure of a stylus pressed thereagainst and onto the backing so that a record is impressed on the record sheet within the protective envelope.

7. In an article of manufacture adapted to receive a record in places likely to prove destructive of a record sheet, in combination: a record sheet forming a record receiving area, a transfer sheet adjacent thereto with the transfer material thereof disposed to be transferred to the record sheet when pressure is applied to the record sheet by a stylus pressing the same against any flat rigid surface, and means for protecting the record sheet from foreign matter such as oil, water, and a gas, comprising a transparent sheet of deformable material impervious to such foreign matter over said record sheet on the opposite side thereof from the transfer material forming a barrier against entry of foreign matter therethrough to the protected members to prevent damage to the record sheet and record thereon, said deformable material being transparent and adapted to transmit pressure of a stylus therethrough so that a record is impressed on the record sheet by the transfer material which is visible through the sheet of deformable material, and said protecting means further comprising a sealing sheet of material proof against passage therethrough of oil, water, and gas on the blank side of the transfer material; said transparent sheet and said sealing sheet being bonded and sealed together along their edges to form a hermetic barrier against entry of such foreign matter to said record sheet and said transfer sheet.

8. In an article of manufacture adapted to receive a record in places likely to prove destructive of a record sheet; in combination, a record sheet forming a record receiving area, means adjacent said record sheet for effecting a legible trace on said record sheet when pressure is applied to said record sheet by a stylus pressing the same against any flat rigid surface; and means for protecting the record sheet and the trace effecting means from foreign matter comprising a sheet of deformable material over said record sheet and said trace effecting means, forming a barrier against entry of foreign matter therethrough to the record sheet and trace effecting means to prevent damage thereto, said deformable material being adapted to transmit pressure of a stylus therethrough so that a record is impressed on the record sheet by the trace effecting means which is visible through the sheet of deformable material and said protecting means further comprising a sealing sheet under the record sheet and trace effecting means; said deformable sheet and said sealing sheet being bonded and hermetically sealed together along their edges to form a barrier against entry of foreign matter such as oil, water, or gas, to said record sheet and said trace effecting means.

9. In an article of manufacture adapted to receive a record in writing under water and in like places likely to prove destructive of a record sheet, in combination: a substantially rigid flat sheet backing member, a transparent record sheet disposed adjacent said backing member in such relation thereto as to be supported thereby and forming a record receiving area coextensive with the area of the backing member, a transfer sheet disposed between the record sheet and the backing member with the transfer material disposed to be transferred to the record sheet when pressure is applied to the record sheet by a stylus pressing the same against the backing member; and means for protecting the transfer sheet, record sheet, and backing member from foreign matter comprising, an envelope of transparent deformable waterproof material entirely encompassing the sheets and member and lying flat against the record sheets and forming an air-tight barrier against entry of foreign matter to the protected members, and adapted to transmit pressure of a stylus pressed thereagainst and onto the backing so that a record is made on the record sheet visible while being made, such article having perforations therethrough forming ring binder openings, the edges of said openings being bonded and hermetically sealed against entry of foreign matter to the record and transfer sheets.

10. A construction according to claim 8, having perforations therethrough forming ring binder openings, the edges of said openings being bonded and hermetically sealed against the entry of foreign matter between the sheets.

11. A construction according to claim 8, having a charge of inert gas therewithin.

12. In combination: means adapted to receive a sealed record, means including an envelope of sheet material impervious to gas and forming a flat surface adjacent the record receiving area of said first named means, means forming a sealed closure for said first named means, said envelope being hermetically sealed, and a charge of inert gas therewithin.

13. In combination, record receiving means, means including an envelope of sheet material impervious to gas and transparent to light which is deformable by a stylus on at least one side thereof receiving said record receiving means and forming a sealed enclosure for said record receiving means to prevent the escape of gas from the envelope and sealed against the entry of oil, gas or water to the record receiving means.

14. A tape having a transparent strip, a translucent record strip narrower than said transparent strip and having one surface thereof disposed against a central longitudinal zone of said transparent strip and visible therethrough, a third strip of material lying parallel to the translucent strip on the side opposite said one surface, said third strip being wider than the translucent strip and providing edge portions in overlapping relation thereto extending into juxtaposition with edge portions of the transparent strip, means bonding the third strip to the transparent strip along said edges, and means adjacent said record strip and said third strip for forming an impression on said record strip visible through said transparent strip in response to the exertion of pressure against said marking means.

15. A tape having a liquid-impervious transparent strip, a record strip adjacent said transparent strip and visible therethrough, said record strip being of translucent material; means adjacent said record strip for forming a permanent readable impression on said record strip, visible through said transparent strip, in response to the exertion of pressure on said record strip through said transparent strip, said means being disposed adjacent the surface of the record strip in such relation that it does not interfere with vision of the impression through the transparent strip; and means forming a pressure-adhesive coating on certain areas of the tape which adheres on contact with a surface and releases under tension, said areas being offset from the record strip in such manner that records may be made on the record strip without action of the coating to cause permanent adhesion to a platen or the like against which the strip is pressed in exerting pressure.

16. A tape having a liquid impervious transparent strip, a record strip adjacent said transparent strip and visible therethrough, said record strip being bonded to said transparent strip to have one surface thereof protected against passage of liquid to the surface thereof adjacent said transparent strip through said transparent strip; and means adjacent said record strip for forming a permanent readable impression on said record strip, visible through said transparent strip, in response to the exertion of pressure on said record strip through said transparent strip, said means being disposed adjacent the surface of the record strip in such relation that it does not prevent vision of the impression through the transparent strip.

17. A tape according to claim 16, the record strip being translucent and the means being disposed on the side thereof away from the transparent strip.

18. A tape having a transparent strip, a record strip adjacent said transparent strip and visible therethrough, said record strip being bonded to said transparent strip to have one surface thereof protected against passage of liquid to the surface thereof adjacent said transparent strip through said transparent strip; and means for forming a permanent readable impression on said record strip, visible through said transparent strip, in response to the exertion of pressure on said record strip through said transparent strip.

19. A continuously flexible recording tape having a liquid-impervious transparent strip of continuously flexible thin sheet material, a record strip of continuously flexible quality adjacent said transparent strip and visible therethrough; continuously flexible means adjacent said record strip for forming a permanent readable impression on said record strip visible through said transparent strip, in response to the exertion of pressure on said record strip through said transparent strip, and means including a protective strip of thin continuously flexible sheet material forming, with the transparent strip, a liquid-sealing closure along the edges of the strips confining the record strip between the protective strip and the transparent strip, said first continuously flexible means being disposed adjacent the surface of the record strip in such relation that it does not interfere with vision of the impression through the transparent strip.

20. A combination as in claim 2, wherein said protective cover is formed of a transparent material.

21. A combination as in claim 2 wherein said protective cover is formed of a sheet material having substantially essential qualities of cellulose acetate.

22. A combination as in claim 2, and a flexible adhesive constituting means of securement of the pressure responsive for marking means to said protective cover.

23. A combination as in claim 22, wherein said marking means is dispersed within the adhesive.

24. A combination as in claim 21 wherein the recording means comprises a transfer coating.

ERVIN G. JOHNSON.

References Cited in the file of this patent

UNITED STATES PATENTS

| Number | Name | Date |
|---|---|---|
| 1,207,814 | Stockton | Dec. 12, 1916 |
| 2,093,086 | Luzzatto | Sept. 14, 1937 |
| 2,322,640 | Schwartzman | Feb. 18, 1941 |
| 2,364,001 | Schieman | Nov. 28, 1944 |
| 2,520,077 | Wolowitz | Aug. 22, 1950 |

FOREIGN PATENTS

| Number | Country | Date |
|---|---|---|
| 234,855 | Great Britain | Dec. 24, 1925 |
| 467,091 | Great Britain | June 7, 1937 |
| 528,680 | Great Britain | Nov. 5, 1940 |